United States Patent
Schukalski et al.

(10) Patent No.: US 12,103,442 B2
(45) Date of Patent: Oct. 1, 2024

(54) DETENT FITTING FOR A VEHICLE SEAT

(71) Applicant: Brose Fahrzeugteile SE & Co. Kommanditgesellschaft, Coburg, Coburg (DE)

(72) Inventors: Jürgen Schukalski, Küps (DE); Jochen Hofmann, Marktgraitz (DE); Peter Hausmann, Coburg (DE)

(73) Assignee: Brose Fahrzeugteile SE & Co. Kommanditgesellschaft, Coburg (DE)

( * ) Notice: Subject to any disclaimer, the term of this patent is extended or adjusted under 35 U.S.C. 154(b) by 201 days.

(21) Appl. No.: 17/433,264

(22) PCT Filed: Feb. 25, 2020

(86) PCT No.: PCT/EP2020/054809
§ 371 (c)(1),
(2) Date: Aug. 24, 2021

(87) PCT Pub. No.: WO2020/173893
PCT Pub. Date: Sep. 3, 2020

(65) Prior Publication Data
US 2022/0089066 A1    Mar. 24, 2022

(30) Foreign Application Priority Data
Feb. 25, 2019 (DE) .................... 10 2019 104 712.9

(51) Int. Cl.
B60N 2/235 (2006.01)
(52) U.S. Cl.
CPC .................. B60N 2/2356 (2013.01)
(58) Field of Classification Search
CPC .................................................. B60N 2/2356
USPC .................................................... 297/367 P
See application file for complete search history.

(56) References Cited

U.S. PATENT DOCUMENTS

| 5,632,525 A | 5/1997 | Uramichi |
| 5,727,846 A | 3/1998 | Yoshida |
| 5,749,624 A | 5/1998 | Yoshida |
| 5,785,386 A | 7/1998 | Yoshida |

(Continued)

FOREIGN PATENT DOCUMENTS

| CN | 106004541 A | 10/2016 |
| DE | 4419411 C2 | 12/1999 |

(Continued)

OTHER PUBLICATIONS

Extended European Search Report for EP 23150849.0, Dated May 4, 2023, English Translation attached to original, All together 14 Pages.

*Primary Examiner* — Anthony D Barfield
(74) *Attorney, Agent, or Firm* — Dickinson Wright PLLC

(57) ABSTRACT

A detent fitting for use in a vehicle seat including a first fitting part and a second fitting part rotatable relative to each other about an axis of rotation, four locking elements movably mounted relative to the first fitting part, configured to move to a locking position in engagement with a toothing of the second fitting part, and a cam element rotatably mounted relative to the first fitting part and including a plurality of cams for supporting the locking elements in the locking position, so that each of the locking elements contacts an associated cam at a support point. Two of the support points are arranged closer to each other than the other support points.

20 Claims, 5 Drawing Sheets

(56) References Cited

U.S. PATENT DOCUMENTS

| | | |
|---|---|---|
| 6,007,152 A | 12/1999 | Kojima et al. |
| 6,010,191 A | 1/2000 | Calinaud et al. |
| 6,023,994 A | 2/2000 | Yoshida |
| 6,024,410 A | 2/2000 | Yoshida |
| 6,092,874 A | 7/2000 | Kojima et al. |
| 6,390,557 B1 | 5/2002 | Asano |
| 6,561,585 B2 | 5/2003 | Cilliere et al. |
| 6,641,217 B2 | 11/2003 | Yamada et al. |
| 6,669,297 B2 | 12/2003 | Cilliere et al. |
| 6,676,217 B2 | 1/2004 | Lange |
| 6,722,738 B2 | 4/2004 | Uramichi |
| 6,749,263 B2 | 6/2004 | Peters |
| 6,786,550 B2 | 9/2004 | Uramichi |
| 6,843,533 B1 | 1/2005 | Miyata et al. |
| 6,923,504 B1 | 8/2005 | Liu et al. |
| 6,991,295 B2 | 1/2006 | Peters |
| 7,021,715 B2 | 4/2006 | Umezaki |
| 7,055,906 B2 | 6/2006 | Shinozaki |
| 7,100,987 B2 | 9/2006 | Volker et al. |
| 7,188,905 B2 | 3/2007 | Ham |
| 7,334,843 B2 | 2/2008 | Yamada et al. |
| 7,341,311 B2 | 3/2008 | Ohba |
| 7,354,109 B2 | 4/2008 | Oki |
| 7,360,838 B2 | 4/2008 | Smuk |
| 7,380,882 B2 | 6/2008 | Oki |
| 7,475,945 B2 | 1/2009 | Reubeuze et al. |
| 7,563,049 B2 | 7/2009 | Peters |
| 7,571,963 B2 | 8/2009 | Peters et al. |
| 7,604,296 B2 | 10/2009 | Yamada |
| 7,614,700 B2 | 11/2009 | Peters |
| 7,677,666 B2 | 3/2010 | Grable |
| 7,703,852 B2 | 4/2010 | Wahls et al. |
| 7,722,121 B2 | 5/2010 | Fujioka et al. |
| 7,819,471 B2 | 10/2010 | Ishihara et al. |
| 8,002,352 B2 | 8/2011 | Yamada et al. |
| 8,002,353 B2 | 8/2011 | Yamada et al. |
| 8,042,872 B2 | 10/2011 | Kim et al. |
| 8,585,149 B2 | 11/2013 | Villarroel et al. |
| 8,602,498 B2 | 12/2013 | Yamada et al. |
| 8,616,648 B2 | 12/2013 | Holzhueter et al. |
| 8,720,999 B2 | 5/2014 | Peters |
| 8,870,287 B2 | 10/2014 | Yamada et al. |
| 8,955,911 B2 | 2/2015 | Yamada et al. |
| 8,960,797 B2 | 2/2015 | Fassbender et al. |
| 9,108,545 B2 | 8/2015 | Maeda |
| 9,199,557 B2 | 12/2015 | Lu et al. |
| 9,205,767 B2 | 12/2015 | Nagura et al. |
| 9,248,761 B2 | 2/2016 | Nagura et al. |
| 9,290,113 B2 | 3/2016 | Mikasa et al. |
| 9,346,376 B2 | 5/2016 | Hiemstra |
| 9,376,036 B2 | 6/2016 | Wei et al. |
| 9,475,410 B2 | 10/2016 | Hur et al. |
| 9,873,357 B1 | 1/2018 | McCulloch et al. |
| 9,902,297 B2 | 2/2018 | Robinson et al. |
| 9,903,453 B2 | 2/2018 | Maeda et al. |
| 9,908,443 B2 | 3/2018 | Nagura et al. |
| 10,029,588 B2 | 7/2018 | Maeda et al. |
| 10,112,507 B2 | 10/2018 | Maeda et al. |
| 10,118,509 B2 | 11/2018 | Kojima et al. |
| 10,155,458 B2 | 12/2018 | Jarry et al. |
| 10,279,709 B2 | 5/2019 | Suzuki et al. |
| 10,406,945 B2 | 9/2019 | Chang |
| 2004/0113475 A1 | 6/2004 | Uramichi et al. |
| 2005/0156454 A1 | 7/2005 | Fast |
| 2007/0145800 A1 | 6/2007 | Thiel et al. |
| 2009/0218870 A1 | 9/2009 | Kawamura et al. |
| 2010/0109408 A1 | 5/2010 | Ohba |
| 2013/0300175 A1* | 11/2013 | Peters |
| 2015/0035337 A1 | 2/2015 | Yamada et al. |
| 2015/0084392 A1 | 3/2015 | Chang |
| 2017/0072818 A1 | 3/2017 | Nagura et al. |
| 2017/0253152 A1 | 9/2017 | Maeda et al. |
| 2018/0009340 A1 | 1/2018 | Nagura et al. |
| 2018/0029506 A1 | 2/2018 | Maeda et al. |

FOREIGN PATENT DOCUMENTS

| | | |
|---|---|---|
| DE | 10102860 A1 | 8/2002 |
| DE | 202005009869 U1 | 10/2006 |
| DE | 102005055703 A1 | 5/2007 |
| DE | 202008008090 U1 | 10/2008 |
| DE | 102010010925 A1 | 9/2011 |
| DE | 102010020013 A1 | 11/2011 |
| DE | 102010053525 B3 | 3/2012 |
| DE | 102010062741 A1 | 6/2012 |
| DE | 102010062932 A1 | 6/2012 |
| DE | 102012004122 A1 | 9/2013 |
| DE | 102012106724 A1 | 1/2014 |
| DE | 102012023057 A1 | 4/2014 |
| DE | 102008018623 B4 | 3/2016 |
| EP | 0250290 A1 | 12/1987 |
| EP | 1197377 A2 | 4/2002 |
| JP | H11155673 A | 6/1999 |
| JP | 2006014943 A | 1/2006 |
| WO | 2009036930 A2 | 3/2009 |
| WO | 2009091980 A1 | 7/2009 |
| WO | 2010020047 A1 | 2/2010 |
| WO | 2011110263 A1 | 9/2011 |
| WO | 2014053260 A1 | 4/2014 |
| WO | 2015027309 A1 | 3/2015 |
| WO | 2016143909 A1 | 9/2016 |
| WO | 2017090828 A1 | 6/2017 |
| WO | 2017094964 A1 | 6/2017 |
| WO | 2017150838 A1 | 9/2017 |

\* cited by examiner

DETENT FITTING FOR A VEHICLE SEAT

CROSS-REFERENCE TO RELATED APPLICATIONS

This application is the U.S. National Phase of PCT Application No. PCT/EP2020/054809 filed on Feb. 25, 2020, which claims priority to German Patent Application No. DE 10 2019 104 712.9, filed on Feb. 25, 2019, the disclosures of which are hereby incorporated in their entirety by reference herein.

TECHNICAL FIELD

This invention relates to a detent fitting for use in a vehicle seat.

BACKGROUND

Such a detent fitting comprises a first fitting part and a second fitting part, which are rotatably mounted relative to each other about an axis of rotation, several, for example, four, locking elements movably mounted relative to the first fitting part, which for locking the detent fitting may be brought into a locking position in which they are in engagement with a toothing of the second fitting part, and a cam element rotatably mounted relative to the first fitting part, comprising a plurality of cams for supporting each of the locking elements in its locking position in such a way that in the locking position each of the locking elements is in contact with an associated cam at at least one support point.

SUMMARY

One or more objects of the present disclosure may be to reduce over-constraint as a result of the number of support points at the cam element as low as possible.

According to one or more embodiments, two of the support points (for example, as seen in the circumferential direction about the axis of rotation) may be arranged closer to each other than to the remaining support points and/or the remaining support points among each other.

As a result, an over-constraint resulting from the use of the relatively large number of four locking elements may be kept relatively low. In this way, a well-balanced force distribution may be achieved in the four locking elements. Each pair of support points adjacent in the circumferential direction includes an angle about the axis of rotation. The angle of the two support points arranged closest to each other is smaller than the angle between the remaining pairs. In general, e.g. four (in particular exactly four) support points may be present. The two support points arranged close to each other may be arranged closer to each other than all remaining pairs of support points at the cam element.

A bisector between the two support points arranged closest to each other (with respect to the axis of rotation) and the remaining support points may be arranged (approximately) at equal distances about the axis of rotation. In this way, an almost statically determinate abutment of the four locking elements against the cam element may be achieved, and all locking elements may be pressed completely into the toothing of the second fitting part. As a result, the load absorption via the locking elements may be effected uniformly, whereby a larger fracture moment may be achieved.

The approximately equal distances enclose e.g. 120 degrees (or about 120 degrees) each about the axis of rotation.

In one embodiment, each of the locking elements has a primary support protrusion and, optionally, a secondary support protrusion. In the locking position of the locking element (regardless of a force acting on the detent fitting) the primary support protrusion is in contact with an associated cam at a support point. The secondary support protrusion gets in contact with a cam (only) upon exceedance of a (specified) force acting on the fitting parts. The primary and the secondary support protrusion of a locking element (for example, of each locking element) may be spaced apart from each other in the circumferential direction.

In one embodiment, the secondary support protrusions have identical angular distances as the primary support protrusions, for example, also in the same order.

There may be provided a total of four primary support protrusions so that between primary support protrusions each adjacent in the circumferential direction a total of four angles may be formed, wherein one angle (e.g. 120 degrees) is greater than the other three angles and one angle (e.g. less than or equal to 30 degrees or 20 degrees, for example, between 10 and 20 degrees) is smaller than the other three angles. Alternatively or additionally, a total of four secondary support protrusions may be provided so that between secondary support protrusions each adjacent in the circumferential direction at total of four angles may be formed, wherein one angle is greater than the other three angles, and one angle is smaller than the other three angles.

Optionally, the secondary support protrusions may be offset by 180 degrees and/or arranged mirror-symmetrically (mirrored on a mirror plane) relative to the primary support points.

In one embodiment, each locking element (as seen in the circumferential direction) is arranged between two adjacent locking elements, of which on application of a force the one locking element tilts in the same direction and the other locking element tilts in a direction opposite to the locking element arranged in between. As compared to an arrangement in which each locking element tilts in a direction opposite to its two adjacent locking elements, such an arrangement may have an advantage that the support points of two locking elements may be arranged so close to each other that a secure locking is possible. An arrangement in which each locking element tilts in a direction opposite to its two adjacent locking elements, on the other hand, usually is substantially over-constrained by comparison so that the components may wobble.

In one embodiment, each locking element has e.g. two adjacent locking elements, of which the one locking element tilts in the same direction and the other locking element tilts in a direction opposite to this middle locking element. For example, it is provided that two pairs of locking elements adjacent to each other in the circumferential direction each tilt in the same direction within the pair and in opposite directions with respect to the locking elements of the other pair. Alternatively or additionally, it is provided that locking elements tilting in the same direction are further away from each other than locking elements tilting in opposite directions.

Optionally, the locking elements may be configured and arranged such that as seen in the circumferential direction they tilt in the following order: in counter-clockwise direction, in counter-clockwise direction, in clockwise direction, in clockwise direction.

According to one or more embodiments, there is provided a detent fitting for a vehicle seat, which may be configured according to any of the embodiments described above, and may include any individual features of the features described above. The detent fitting may include a first fitting part and a second fitting part, which may be rotatably mounted relative to each other about an axis of rotation, a plurality of locking elements movably mounted relative to the first fitting part, which for locking the detent fitting may be brought into a locking position in which they may be in engagement with a toothing of the second fitting part, and a cam element rotatably mounted relative to the first fitting part, comprising a plurality of cams for supporting each of the locking elements in its locking position. Two of the locking elements may be supported on a common cam of the cam element, for example, supported in the locking state.

As a result, it is possible to arrange two of the locking elements may be close to each other, whereby in the plane of the locking elements room becomes available for other components of the detent fitting. This provides for a relatively loadable detent fitting which at the same time requires little installation space. By rotating the cam element, the locking elements may be moved from the locking position into an unlocking position, in which they are not in engagement with the toothing of the second fitting part (or, depending on the direction of rotation of the cam element, movable from the unlocking position into the locking position).

The common cam includes e.g. support surfaces for supporting support protrusions of the two (adjacent) locking elements. Optionally, the support surfaces of the common cam may be arranged radially offset from each other (with respect to the axis of rotation). One of the support surfaces is arranged e.g. further outside than the other support surface. As a result, it is possible to keep the rotary movement necessary for unlocking relatively small.

The cam element may include receiving areas. The receiving areas may be configured for example in such a way that the support protrusions of the locking elements may engage into the same, when the locking elements may be arranged in an unlocking position (out of engagement with the toothing of the second fitting part). Each receiving area is defined e.g. by two opposite side flanks. According to one development, the cams of the cam element may be each delimited by two receiving areas adjacent to each other in the circumferential direction about the axis of rotation. As seen in the circumferential direction, the receptacles and cams alternate. For example, the receiving areas are set back radially towards the axis of rotation with respect to adjacent support surfaces of the cam element.

It may be provided that no receiving area is formed between support surfaces for supporting support protrusions of two (adjacent) locking elements. These may be e.g. the support surfaces of the common cam. As a result, the two corresponding locking elements may be arranged close to each other.

The locking elements may all be arranged in the same plane. In one embodiment, at least one spring is provided, which is arranged in the same plane as the locking elements. For example, the spring pretensions the cam element into the locking position. Due to the arrangement of the spring in the plane of the locking elements, a flat detent fitting with integrated spring bias is possible at the same time by maintaining a stable stand of the locking elements.

Optionally, all cams of the cam element may be different from the remaining cams.

At least some of the cams may have a support surface that is inclined with respect to a circle concentric with the axis of rotation, by which one of the locking elements may each be urged into engagement with the toothing of the second fitting part and/or may frictionally be secured in engagement with the toothing of the second fitting part. The inclined support surfaces effect a radial movement of the locking elements (with respect to the axis of rotation) and may also be referred to as control surfaces.

At least some of the cams may have a support surface that is concentric with respect to the axis of rotation, by means of which a locking element disposed in the locking position may each be secured in engagement with the toothing of the second fitting part. These support surfaces may also be referred to as securing surfaces.

Optionally, the cam element includes two common cams each for two locking elements, wherein one of the common cams may include two concentric support surfaces and the other of the common cams may include two inclined support surfaces. Alternatively, each of the common cams may have two inclined support surfaces or each of the common cams may have two concentric support surfaces, or at least one common cam or both common cams each have an inclined support surface (for a locking element) and a concentric support surface (for another locking element).

In one embodiment, a gap is formed between at least one concentric support surface and the associated locking element disposed in the locking state (in engagement with the toothing of the second fitting part). It may be provided that upon exceedance of a (predetermined) force acting on the fitting parts the gap is closed so that the locking element may be supported on the associated concentric support surface. Thus, in normal use of the detent fitting the gap exists so that only few points of contact between the cam element and the locking elements are present. Thus, the cam element may be of the smooth-running type and over-constraints may be avoided. In case of an overload, e.g. as a result of a vehicle crash, the predetermined force is exceeded and the locking elements may be supported on additional support surfaces, and thus may be held in the locking position securely.

Optionally, at least one tooth filling is provided on the toothing of the second fitting part. The tooth filling closes e.g. the space between two or more adjacent teeth of the toothing. Optionally, the tooth filling protrudes inwardly from the adjacent teeth. The tooth filling serves a better and lower-wear locking behavior on retraction of the locking elements from the free-pivoting area into the latching area. This provides for a simpler configuration of the transition contour from the free-pivoting area into the latching area on a free-pivoting element.

The detent fitting furthermore may comprise a free-pivoting device, e.g. in the form of a separate plate or in the form of a material portion of one of the fitting parts, e.g. of the second fitting part. The free-pivoting device includes a free-pivoting portion which is configured to cooperate with at least one of the locking elements in the state out of engagement with the toothing of the second fitting part in such a way that a movement of the locking element into the locking position is prevented. Optionally, the free-pivoting portion extends about the axis of rotation over more than 90 degrees. Thus, a vehicle seat comprising the detent fitting may be pivoted freely without the detent fitting always having to be actuated, e.g. into an easy-entry position and/or into a fold-flat position.

The locking elements may be arranged at different distances to each other (e.g. measured as an angle about the axis of rotation). Between the larger distances, room may be available for other components, e.g. one or more springs.

Optionally, the detent fitting may include four, or exactly four locking elements, which provides for a loadable detent fitting.

According to one or more embodiments, a vehicle seat is provided that may include a seat part and a backrest pivotable relative to the seat part. The vehicle seat furthermore may include at least one detent fitting according to an arbitrary design described herein, such as a pair of such detent fittings coupled with each other. The detent fitting pivotally connects (or the detent fittings pivotally connect) the backrest to the seat part. This vehicle seat may be a loadable design so that the detent fitting or the detent fittings is/are not unlocked even in the case of an overload, e.g. as a result of a vehicle crash. At the same time, it is possible that the detent fitting or the detent fittings requires or require relatively little installation space.

BRIEF DESCRIPTION OF THE DRAWINGS

The idea underlying the invention will be explained in detail below with reference to the exemplary embodiments illustrated in the Figures. In the drawing.

DETAILED DESCRIPTION

Figure 1:
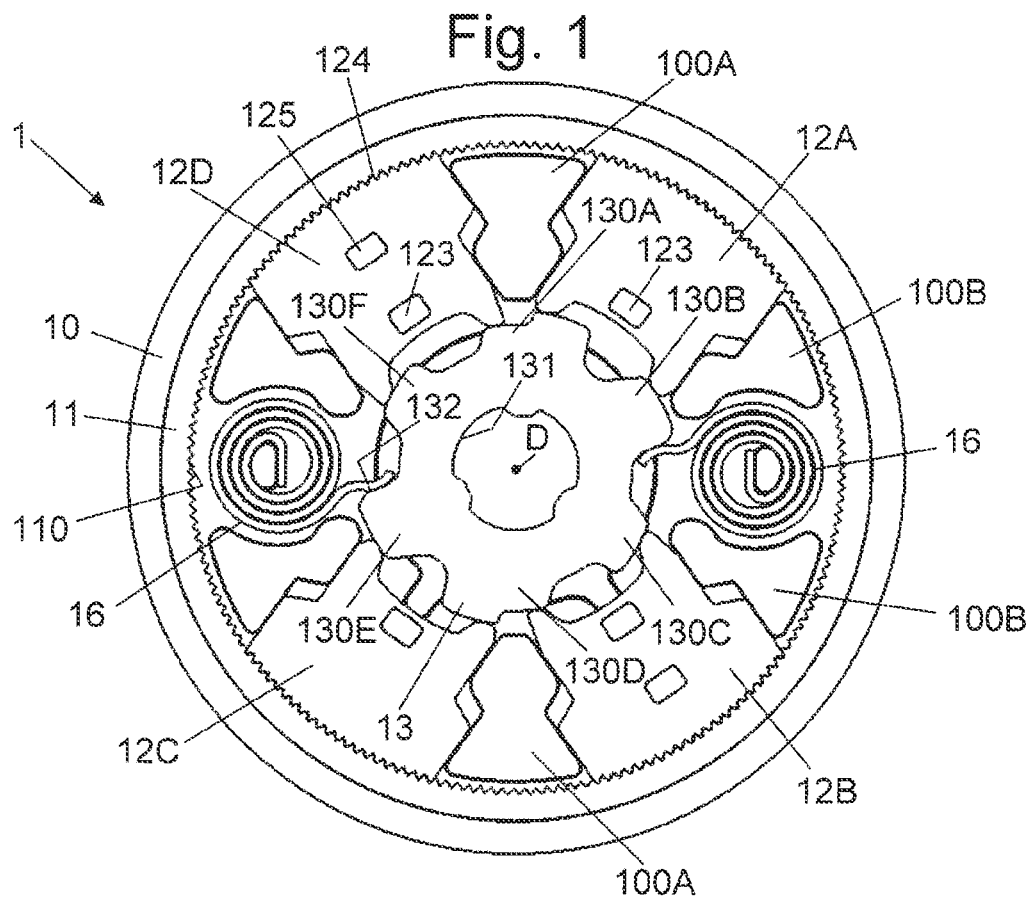
FIG. 1 shows a cross-sectional representation of a detent fitting in the locked state with two fitting parts, four locking elements and a resiliently pretensioned cam element.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known detent fitting is described in EP 2 326 531 B1 and comprises four locking elements there, which provides for a particularly high loadability of the detent fitting. However, the locked state of this known detent fitting may be over-constrained due to a large number of support points at the cam element, and as a result of manufacturing tolerances at least one of the locking elements may have a radial clearance in the locked state. As a result, the loadability of the detent fitting may again be reduced.

FIGS. 1 to 5 show a detent fitting 1 in which a first fitting part 10 and a second fitting part 11 may be pivotally mounted on each other about an axis of rotation D. The detent fitting 1 serves for pivotally connecting two vehicle parts to each other, for example for connecting a backrest of a vehicle seat to a seat part of the vehicle seat. In a locked state, the detent fitting 1 non-rotatably holds the vehicle parts at each other and may be unlocked for pivoting the vehicle parts relative to each other.

On the first fitting part 10 several, in the present case four locking elements 12A-12D are arranged. The locking elements 12A-12D serve for locking the detent fitting 1. The locking elements 12A-12D may be designed in the form of locking bolts and mounted on the first fitting part 10 so as to be shiftable radially to the axis of rotation D. For this purpose, each locking element 12A-12D is radially shiftably guided between two guide portions 100A, 100B formed on the first fitting part 10 or mounted on, such as axially protruding from a base body of the first fitting part 10. In the present case, each of the locking elements 12A-12D is of one-part design.

The second fitting part 11 has a toothing 110 which in the present case is formed on a ring portion of the second fitting part 11. The toothing 110 of the second fitting part 11 is designed as an internal toothing. Each locking element 12A-12D has a toothing 124, in the present case each on a radially outer circumferential portion. The toothing 124 of each of the locking elements 12A-12D is designed to come into engagement with the toothing 110 of the second fitting part 11, in order to lock the two fitting parts 10, 11 with each other.

The position in which the locking elements 12A-12D may be in locking engagement with the toothing 110 of the second fitting part 11 may also be referred to as locking position of the locking elements 12A-12D. A torque on the fitting parts 10, 11 with the locking elements 12A-12D in the locking position urges the locking elements 12A-12D against the guide portions 100A, 100B so that a movement of the fitting parts 10, 11 relative to each other is blocked.

The locking elements 12A-12D furthermore may be brought into an unlocking position in which the locking elements 12A-12D are not in engagement with the toothing 110 of the second fitting part 11 and thus enable a rotation of the two fitting parts 10, 11 relative to each other. The locking elements 12A-12D may be mounted on the first fitting part 10 so as to be radially shiftable from the unlocking position into the locking position (and vice versa).

The detent fitting 1 furthermore may include a cam element in the form of a cam disk 13. The cam disk 13 is arranged centrally between the locking elements 12A-12D. The cam disk 13 is arranged in a space between the first fitting part 10 and the second fitting part 11 and pivotable about the axis of rotation D relative to the first fitting part 10 (and to the second fitting part 11). In the present case, the cam disk 13 is of one-part design.

The cam disk 13 is rotatable relative to the first fitting part 10 between a position holding the locking elements 12A-12D in their locking position and a position allowing unlocking of the locking elements 12A-12D.

The cam disk 13 may include several (here six) radially outwardly protruding cams 130A-130F. The cams 130A-130F of the cam disk 13 each comprise one or more support surfaces 133, 134.

The locking elements 12A-12D each include support protrusions 121A-121D facing the cam disk 13. The support protrusions 121A-121D may be formed on the side of the respective locking element 12A-12D facing away from the toothing 124. The two support protrusions 121A-121D may be spaced apart from each other. When the cam disk 13 is in its locking position, one cam 130A-130F each of the cam disk 13 faces the support protrusions 121A-121D of the locking elements 12.

Some support surfaces 134 of the cam disk 13 each have a radially ascending contour with respect to a rotation of the cam disk 13 relative to the first fitting part 10 in a direction towards the locking position. These support surfaces may also be referred to as inclined support surfaces 134. For example, the inclined support surfaces 134 of the cam disk 13 at least one point each may be inclined with respect to a tangent to the circumferential direction about the axis of rotation D at this point with a positive angle (e.g. about 2 degrees to 6 degrees, such as about 4 degrees). The contour of the inclined support surfaces 134 is different from a concentric (circular) shape. The cam disk 13 thereby may shift the locking elements 12A-12D radially to the outside. In the process, support protrusions 121B, 121D of the locking elements 12A-12D associated to the inclined support surfaces 134 slide along the inclined support surfaces 134 of the cam disk 13. As soon as the toothing 124 of the locking elements 12A-12D is brought into abutting engagement with the toothing 110 of the second fitting part 11, a frictional contact is established between the cam disk 13 and the locking elements 12A-12D. This provides for a clearance-free locking state of the detent fitting 1. In addition, the frictional contact may secure the detent fitting 1 against unwanted unlocking, when a load that urges the locking elements 12A-12D against the cam disk 13 acts on the detent fitting 1.

The inclined support surfaces 134 thus serve for moving the locking elements 12A-12D from the unlocking position into the locking position and for securing the locking elements 12A-12D in their respective locking position. The support protrusions 121B, 121D, which cooperate with an inclined support surface 134, may also be referred to as primary support protrusions 121B, 121D.

Further support surfaces 133 of the cam disk 13 have a contour that is concentric with respect to the axis of rotation D. These support surfaces 133 may be configured to each support an associated support protrusion 121A, 121C when the respective locking element 12A-12D is arranged in the locking position and a force acts on the same. These support surfaces 133 may also be referred to as concentric support surfaces 133. The support protrusions 121A, 121C, which cooperate with a concentric support surface 133, may also be referred to as secondary support protrusions 121A, 121C.

Between the concentric support surfaces 133 and the associated support protrusions 121A, 121C a distance and hence a gap S is formed in normal use. When a force that exceeds a certain force acts on the fitting parts 10, 11, the gap S is closed (e.g. as a result of a rotation and/or deformation of the locking elements 12A-12D) and one or more of the support protrusions 121A, 121C may be supported on the concentric support surfaces 133. As the concentric support surfaces 133 are not inclined, a pressure acting thereon does not lead to an opening moment. The concentric support surfaces 133 effectively prevent the toothings 124, 110 from getting out of engagement.

In the present case, the primary support protrusions 121B, 121D and the secondary support protrusions 121A, 121C may be configured and arranged such that as a result of acting forces (e.g. in the case of a vehicle crash) the locking elements 12A-12D tilt in clockwise direction or in counter-clockwise direction with respect to their respective axes of displacement (defined by the guide portions 100A, 100B) on the first fitting part 10. The locking elements 12A-12D have the following tilting directions (in this order, starting with the locking element 12A shown on the upper right in FIG. 3): in counter-clockwise direction, in counter-clockwise direction, in clockwise direction, in clockwise direction. Two primary support protrusions 121B, 121D may be arranged close to each other so that despite the use of four locking elements 12A-12D, no substantial over-constraint exists at the cam disk 13. Therefore, the cam disk 13 is able to lock all locking elements 12A-12D substantially without clearance.

Two of the locking elements 12A-12D each may be supported on a common cam 130A, 130D. Concretely, the support protrusions 121A-121D of the two adjacent locking elements 12A-12D facing each other cooperate with the (same) common cam 130A, 130D. The cam disk 13 may include two cams 130A, 130D which each are configured and arranged to cooperate with two locking elements 12A-12D. These (common) cams 130A, 130D are broader than the remaining cams 130B, 130C, 130E, 130F.

The cam disk 13 has a smaller number of (here six) cams 130A-130F than the locking elements 12A-12D in sum comprise support protrusions 121A-121D (here eight).

The common cams 130A, 130D each include several, concretely two support surfaces 133, 134, which are each associated to another of the locking elements 12A-12D. In each common cam 130A, 130D the two support surfaces 133, 134 form sections of the common cam 130A, 130D.

A common cam 130A may include two concentric support surfaces 133. The two concentric support surfaces 133 extend along various radii to the axis of rotation D. The other common cam 130D may include two inclined support surfaces 134. The inclined support surfaces 134 each have the same slope (here 4 degrees), but extend along mutually offset radii. One of the support surfaces 134 (the leading one in the unlocking direction) is arranged radially further outside than the other one.

The support surfaces 133, 134 each formed on a further cam 130B, 130C, 130E, 130F may each be arranged on the same radii as the support surface 133, 134 of the common cam 130A, 130D associated to the same locking element 12A-12D. As a result, two diametrically opposite locking elements 12A, 12C may be shorter in radial direction than the two other, likewise diametrically opposite locking elements 12B, 12D. As a result, there may be provided two cams 130B, 130E (each cooperating with only one locking element 12A, 12C), which radially protrude more than two further cams 130C, 130F (each cooperating with only one locking element 12B, 12D). One of the two cams 130B, 130E located further outside and of the two cams 130C, 130F located further inside each has a concentric support surface 133, and the respectively other cam 130B, 130C, 130E, 130F has an inclined support surface 134.

Thus, all cams 130A-130F of the cam element 13 may be formed differently.

Figure 3:
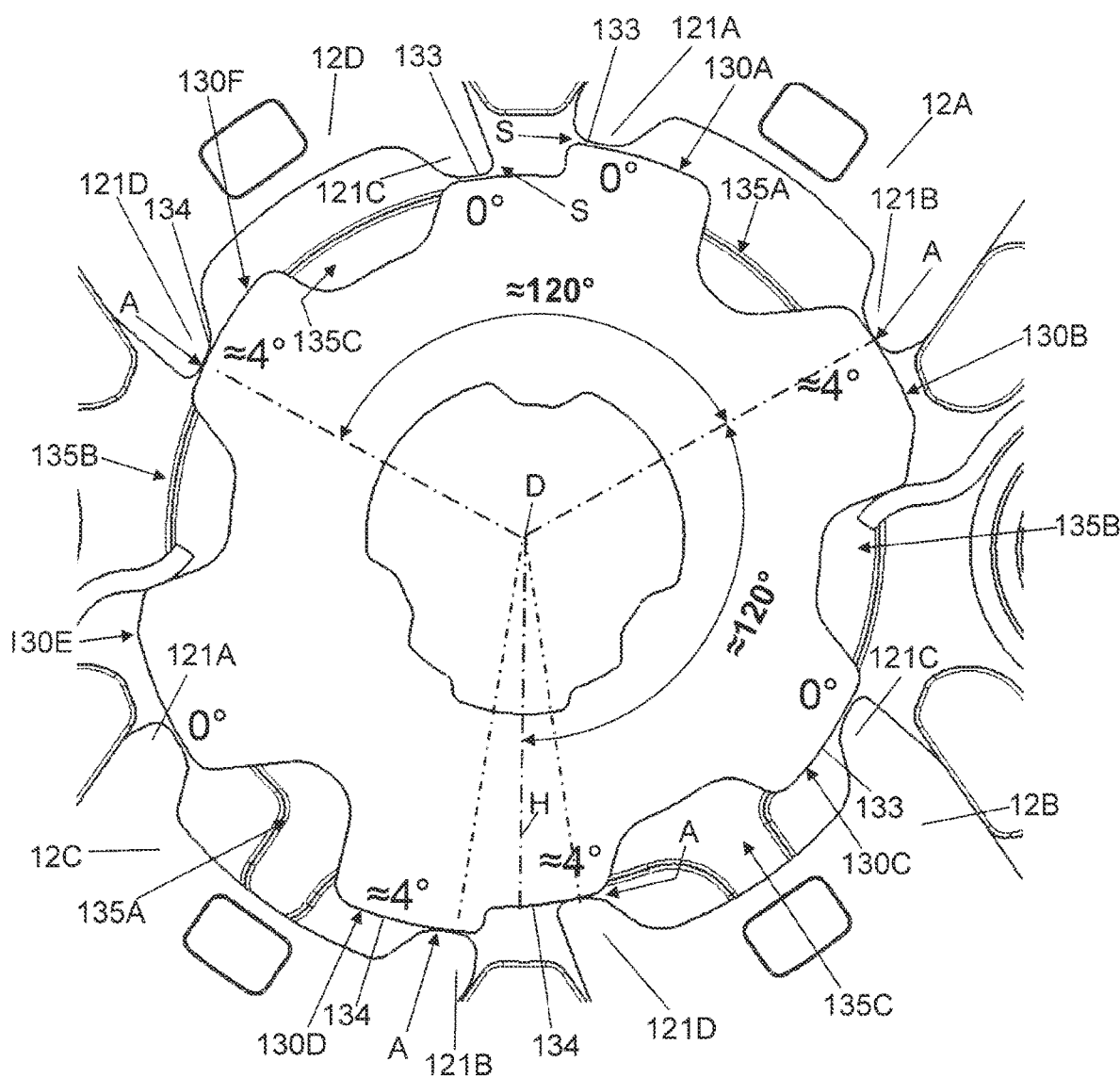
FIG. 3 shows an enlarged section of the representation of FIG. 1.

As an example with reference to FIG. 3 it may be seen that each of the locking elements 12A-12D is in contact with the inclined support surface 134 of an associated cam 130B, 130D, 130F at a support point A, when the locking elements 12A-12D may be arranged in the locking position. In normal use, exactly four support points A may be formed.

Two of the support points A may be arranged closer to each other than to the remaining support points A and the remaining support points A among each other.

At least between two support points adjacent in the circumferential direction, an angle of 120 degrees (or 120+/−5 degrees) is formed (with respect to the axis of rotation D).

With respect to the axis of rotation D, a bisector H may be defined between the two support points A arranged closer to each other. The bisector H and the two remaining support points A may be arranged at approximately equal distances about the axis of rotation D, i.e. with angles of (about) 120 degrees (illustrated in FIG. 3 with dash-dotted lines).

As a result, an almost statically determinate locking position is achieved. The cam disk 13 is centered under load between the support points A. As two of the support points A may be arranged close to each other (e.g. at a distance of few degrees, for example less than 20 degrees, less than 10 degrees or even less than 5 degrees), the detent fitting 1 in this respect behaves similar to a detent fitting with only three locking elements, due to the fourth locking element, however, with a comparatively higher loadability.

Figure 2:
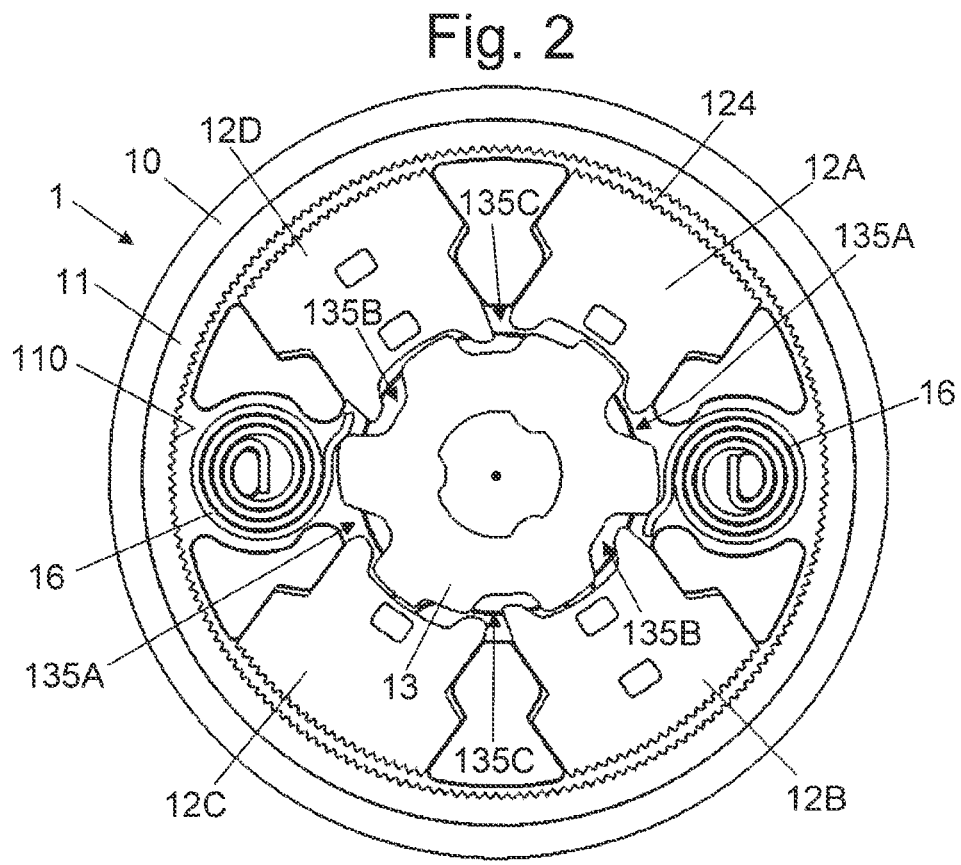
FIG. 2 shows the detent fitting of FIG. 1 in an unlocked state.

The cam element 13 furthermore has receiving areas 135A-135C into which the support protrusions 121A-121D of the locking elements 12A-12D engage when the locking elements 12A-12D may be arranged in the unlocking position, see FIG. 2, for example. As seen in a circumferential direction about the axis of rotation D, receiving areas 135A-135C and cams 130A-130F alternate. Each cam 130A-130F protrudes radially outwards with respect to the two adjacent receiving areas 135A-135C.

Adjacent to each common cam 130A, 130D a common receptacle 135C is provided, which is configured to accommodate one support protrusion 121A-121D each of the two locking elements 12A-12D associated to the common cam 130A, 130D. The remaining receiving areas 135A, 135B each are configured to receive (exactly) one support protrusion 121A-121D.

Between the support surfaces 133, 134 of each of the common cams 130A, 130D no receiving area is provided for a support protrusion 121A-121D. The support surfaces 133, 134 of each of the common cams 130A, 130D directly merge into each other via a flank.

Two locking elements 12A-12D each associated to a common cam 130A, 130D are arranged closer (more narrowly) to each other than to the remaining locking elements 12A-12D. As a result, sufficient room is available between two locking elements 12A-12D, which each are associated to another of the common cams 130A, 130D, in order to arrange other components of the detent fitting 1, here springs 16.

The cam disk 13 is pretensioned into its locking position by means of several, here two springs 16. This provides for comfortable locking by means of the springs 16. The springs 16 may be supported on the first fitting part 10 and exert a force on stops 132 of the cam disk 13. The springs 16 may be arranged on opposite sides of the cam disk 13. The springs 16 may be arranged in the plane of the locking elements 12A-12D, which provides for a relatively flat design. In the present case, the springs 16 may each formed as spiral springs.

Figure 4C:
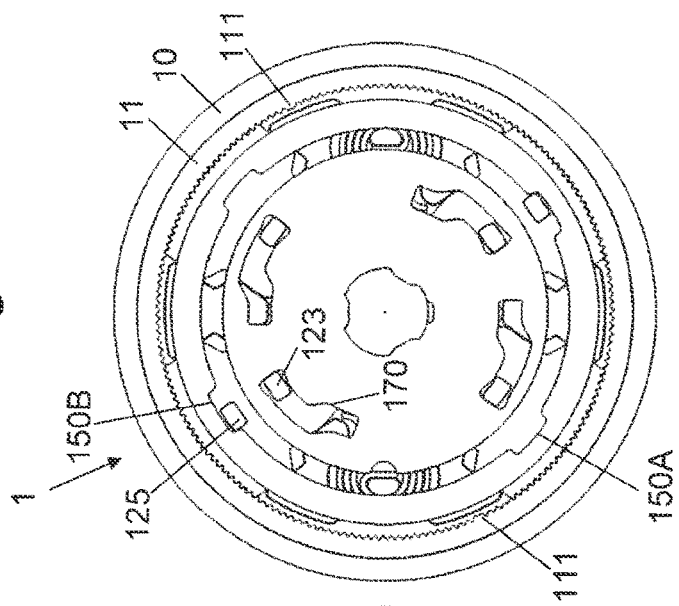
FIGS. 4A to 4C show cross-sectional representations of the detent fitting of FIGS. 1 to 3 in various states.
Figure 4B:
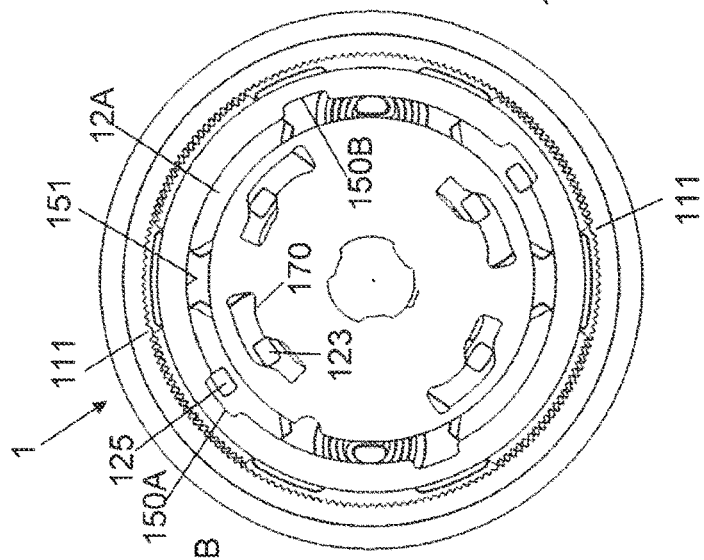
Figure 4A:
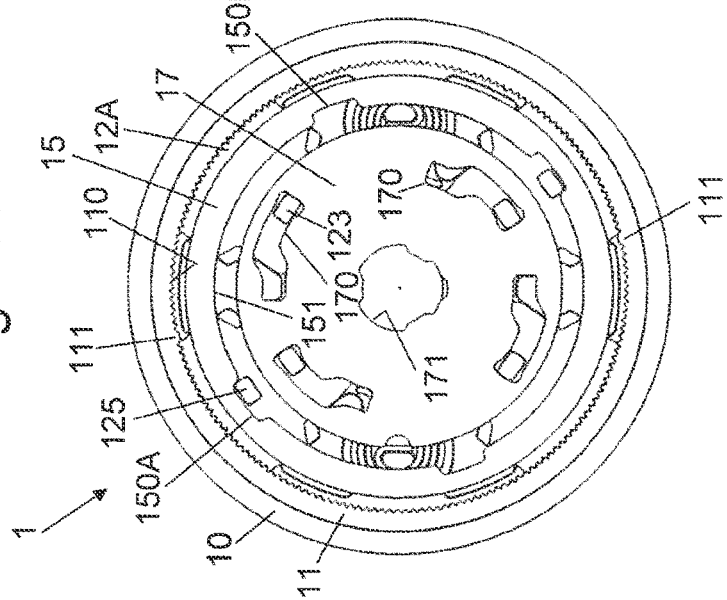

As is shown in FIGS. 4A to 4C, the detent fitting 1 furthermore may include a control element 17 in the form of a sliding plate and a free-pivoting device 15.

The cam disk 13 and the control element 17 each include a central receptacle 131, 171 for the positive connection with an actuating element (e.g. a shaft, bushing, etc.). When the actuating shaft is rotated relative to the first fitting part 10 in an unlocking direction proceeding from the locked state of FIGS. 1 and 4A, the actuating shaft will rotate the control element 17 and the cam disk 13.

The control element 17 may include a coulisse 170 for each locking element 12A-12D. In each coulisse 170 a pin 123 or another axially protruding area of the associated locking element 12A-12D is received. The coulisse 170 has a radially inner region and a radially outer region, which may be connected to each other by slopes. A rotation of the control element 17 urges a slope of each coulisse 170 against the tab 123 received therein and thus, depending on the direction of rotation, urges the locking element 12A into the unlocked position (shown in FIG. 2) or into engagement with the toothing 110 of the second fitting part 11 (shown in FIG. 1).

The control element 17 is of disk-shaped design. It is arranged coaxially to the cam disk 13. The control element 17 and the cam disk 13 may be arranged side by side along the axis of rotation D. In the present case, the control element 17 and the cam disk 13 rest against each other.

To again lock the detent fitting 1, it is sufficient to no longer actuate the actuating shaft. The springs 16 urge the cam disk 13 and the control element 17 into the respective starting position shown in FIGS. 1 and 4A. The cam disk 13 rotates relative to the first fitting part 10 so that the inclined support surfaces 134 slide along the locking bolts 12A-12D and shift the same radially to the outside and press them into engagement with the toothing 110 of the second fitting part 11.

The actuating shaft is coupled with an actuating member for actuating the actuating shaft. The actuating member is configured e.g. as an actuating lever or as an (for example, electric) actuator.

The free-pivoting device 15 is formed on the second fitting part 11 or non-rotatably mounted thereon. In the example shown, the free-pivoting device 15 is configured as a free-pivoting disk. The free-pivoting device 15 is ring-shaped. On its inner circumference, the free-pivoting device 15 has several (here four) receptacles 150A, 150B. The receptacles 150A, 150B may be connected by free-pivoting portions 151 radially inwardly protruding with respect to these receptacles 150A, 150B. The free-pivoting portions 151 may be circular arc-shaped. Two receptacles 150A, 105B each are formed on opposite areas of the free-pivoting device 15.

On two of the locking elements 12B, 12D a pin 125 or another axially protruding area is mounted or formed, which engages into one of the receptacles 150A, 150B when the detent fitting 1 is in the locked state. When the cam disk 13 is rotated into an unlocked position (FIG. 4B shows an intermediate position on the way there), the locking elements 12B, 12D may be shifted radially inwardly. Due to a succeeding rotation of the fitting parts 10, 11 relative to each other, the pins 125 of the locking elements 12B, 12D are moved into the free-pivoting portions 151 of the free-pivoting device 15. Due to an abutment of the pins 125, the free-pivoting portions 151 prevent a displacement of the locking elements 12B, 12D with the pins 125 into the locked position. Due to coupling by means of the control element 17, a displacement of the remaining locking elements 12A, 12C into the locked position also is prevented. Some locking elements, namely the locking elements 12B, 12D thus serve as master locking elements, the rest of them as slave locking elements. The master/slave principle with opposed master locking elements 12B, 12D (distance of 180°) provides for a free-pivoting range of more than 90 degrees.

The pins 125 may be shifted, for example, slide along the free-pivoting portions 151.

Thus, the free-pivoting device 15 defines an angular range of the position of the two fitting parts 10, 11 relative to each other, in which the detent fitting 1 may no longer be locked, for example, also when an actuating member is no longer actuated. As a result, a backrest of a vehicle seat equipped with a detent fitting 1 may easily be folded forwards into a cargo position towards a seat part of the vehicle seat and be folded back again (see also FIG. 6).

Seen in the circumferential direction about the axis of rotation D, the receptacles 150A are greater (have a greater width) than the pins 125. The receptacles 150A thereby define an angular range of the position of the two fitting parts 10, 11 relative to each other, in which the detent fitting 1 may be locked. In this angular range, also referred to as comfort range, an individual adjustment and locking of the inclination of the backrest with respect to the seat part thus becomes possible. The respective second receptacle 150B per pin 125 allows locking of the detent fitting 1 in the cargo position.

FIGS. 4A to 4C furthermore show optional tooth fillings 111, two of which here are provided diagonally opposite each other. The tooth fillings 111 are formed on the toothing 110 of the second fitting part 11 and provide for safe latching. The tooth fillings 111 fill up the area between adjacent teeth of the toothing 110. Each tooth filling 111 sectionally interrupts the toothing 110 of the second fitting part 11. There may be provided one or more tooth fillings (here two, for example, exactly two). The paired arrangement of the locking elements 12A-12D provides for using the at least one tooth filling 111 for retraction into the foremost comfort detent from the free-pivoting area.

The receptacles 150A, 150B and free-pivoting portions 151 of the free-pivoting device 15 jointly define a control contour. The tooth fillings 111 each are arranged in the region of a boundary between a free-pivoting portion 151 and a receptacle 150A, 150B and each serve to ensure, in a case of wear due to which the control contour of the free-pivoting device 15 is destroyed in the region of the boundary, that the corresponding locking element 12A-12D may get into engagement with the toothing 110 of the second fitting part 11 only outside the free-pivoting area 151 (i.e. only after entering into the receptacle 150A, 150B). On the one hand, this is advantageous in order to avoid locking in a case of wear inside the free-pivoting portion 151. On the other hand, it may be ensured in this way that, in a case of wear, partial incomplete locking cannot occur within the free-pivoting portion 151 due to only partial engagement of the at least one locking element 12A-12D in the toothing 110 of the second fitting part 11.

Figure 5:
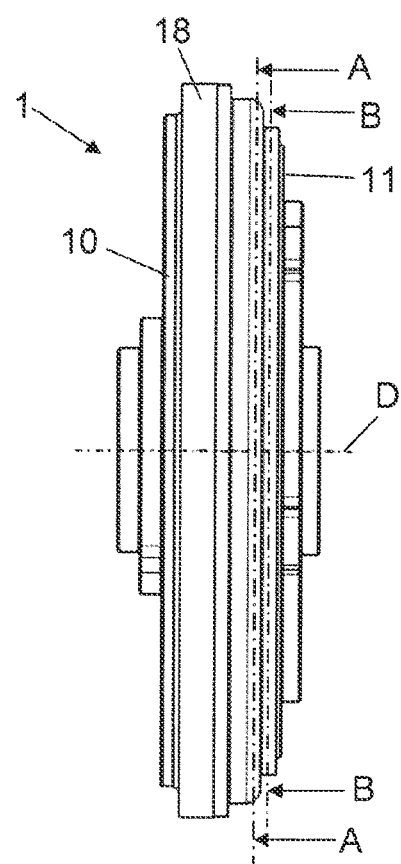
FIG. 5 shows a side view of the detent fitting of FIGS. 1 to 4C, wherein a cross-section A-A is indicated, which corresponds to the view of FIGS. 1 to 3, and a cross-section B-B which corresponds to the view of FIGS. 4A to 4C.

FIG. 5 shows the detent fitting 1 in a side view. As an example, there is shown a clasping ring 18 by means of which the two fitting parts 10, 11 are held at each other so as to be rotatable relative to each other The clasping ring 18 is firmly connected, e.g. welded, to one of the two fitting parts 10, 11 and positively encloses the other of the two fitting parts 10.

Figure 6:
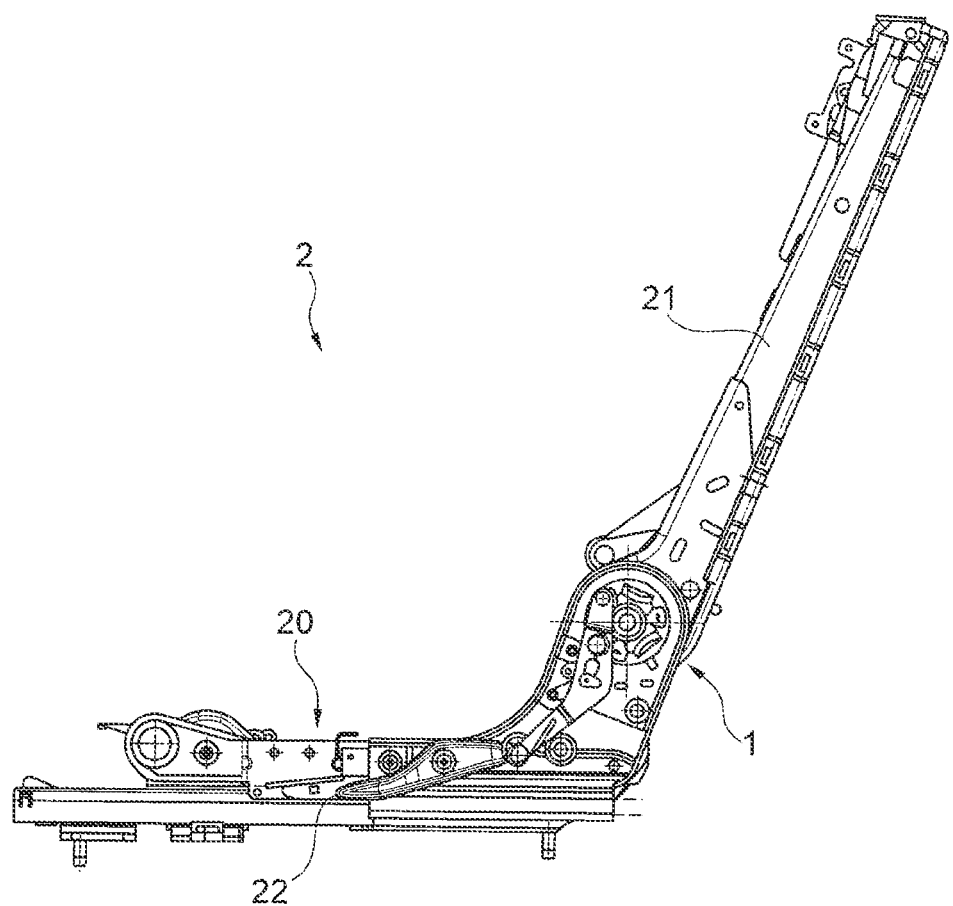
FIG. 6 shows a vehicle seat with the detent fitting of FIGS. 1 to 5.

The vehicle seat 2 of FIG. 6 may include a seat part 20, a backrest 21 and one or more detent fittings 1 shown in FIGS. 1 to 5. One of the two fitting parts 10, 11 (e.g. the first fitting part 10) is firmly connected to the seat part 20, and the other of the two fitting parts 10, 11 is firmly connected to the backrest 21. By means of the detent fitting 1 (or the detent fittings 1), the inclination of the backrest 21 relative to the seat part 20 may be adjusted and be locked in various possible tilt positions.

The vehicle seat 2 for example is a rear seat bench or a part of a rear seat bench of a vehicle, for example the larger part of a rear seat bench split 60:40. The vehicle seat 2 may provide one or more, e.g. two or three seating positions.

The detent fitting 1 is pretensioned into the locked state. As long as an actuating lever non-rotatably connected to the actuating shaft is not actuated, the detent fitting 1 hence is in the locked state.

The actuating lever of the detent fitting 1 is operatively connected to a handle 22 (via a swivel lever arrangement) so that an actuation of the handle 22 unlocks the detent fitting 1 in order to allow a tilt position of the backrest 21 with respect to the seat part 20.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS 1 detent fitting
10 first fitting part
100A, 100B guide portion
11 second fitting part
110 toothing
111 tooth filling
12A-12D locking element
121A-121D support protrusion
123 pin
124 toothing
125 pin
13 cam disk (cam element)
130A-130F cam
131 receptacle
132 stop
133 concentric support surface
134 inclined support surface
135A-135C receiving area
15 free-pivoting device
150A, 150B receptacle
151 free-pivoting portion
16 spring
17 control element
170 coulisse
171 receptacle
18 clasping ring
2 vehicle seat
20 seat part
21 backrest
22 handle
A support point
D axis of rotation
H bisector
S gap While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A detent fitting for use in a vehicle seat, the detent fitting comprising:
   a first fitting part and a second fitting part, the first fitting part and the second fitting part are each rotatable relative to each other about an axis of rotation;
   four locking elements movably mounted relative to the first fitting part and configured to move to a locking position, in which each of the four locking elements engage a toothing of the second fitting part, wherein each of the locking elements includes a primary support protrusion; and
   a cam element, rotatably mounted relative to the first fitting part, and including a plurality of cams configured to support the four locking elements disposed in the locking position so that the primary support protrusion of each of the locking elements is in contact with one of the cams of the plurality of cams at a respective support point of four support points, wherein each of the four locking elements disposed in the locking position contacts the cam element only with its primary support protrusion when no force is acting on the first and second fitting parts and wherein two support points of the four support points, that support the primary support protrusions of two adjacent locking elements of the four locking elements, are arranged closer to each other than to the other two support points of the four support points and than the other two support points of the four support points are to each other.

2. The detent fitting of claim 1, wherein a bisector is disposed between the two support points arranged closer to each other and extends from the axis of rotation, and the other two support points are arranged at approximately equal distances from the bisector with respect to the axis of rotation.

3. The detent fitting of claim 2, wherein the approximately equal distances each enclose 120 degrees about the axis of rotation.

4. The detent fitting of claim 1, wherein each of the locking elements includes a secondary support protrusion and when each of the locking elements are in the locking position, the secondary support protrusion is configured to contact a cam of the plurality of cams in response to an exceedance of a force acting on the first and second fitting parts.

5. The detent fitting of claim 4, wherein each of the secondary support protrusions are spaced apart from one another by an angular distance and each of the primary support protrusions are spaced apart from one another by the angular distance.

6. The detent fitting of claim 4, wherein between the primary support protrusions, each adjacent in a circumferential direction, a total of four angles are formed, wherein one angle is greater than the other three angles, and one angle is smaller than the other three angles, and a total of four secondary support protrusions are provided so that between secondary support protrusions, each adjacent in the circumferential direction, a total of four angles are formed, wherein one angle is greater than the other three angles and one angle is smaller than the other three angles.

7. The detent fitting of claim 4, wherein the secondary support protrusions are arranged offset by 180 degrees from the primary support protrusions.

8. The detent fitting of claim 1, wherein the four locking elements include a first locking element, a second locking element, and a third locking element, and with respect to a circumferential direction, the first locking element is arranged between the second locking element and the third locking element, the second and third locking elements are disposed adjacent to one another, and in response to an application of a force, the first locking element and the second locking element each tilt in a first direction and the third locking element tilts in a second direction, wherein the second direction is opposite the first direction.

9. The detent fitting of claim 8, wherein the four locking elements include a fourth locking element and with respect to the circumferential direction, the first locking element tilts in a counter-clockwise direction, the second locking element tilts in the counter-clockwise direction, the third locking element tilts in a clockwise direction, and the fourth locking element tilts in the clockwise direction.

10. A detent fitting for use in a vehicle seat, the detent fitting comprising:

a first fitting part and a second fitting part each configured to rotate relative to one another about an axis of rotation;

a plurality of locking elements movably mounted relative to the first fitting part and configured to move to a locking position, in which the plurality of locking elements engage a toothing of the second fitting part; and a cam element rotatably mounted relative to the first fitting part and including a plurality of cams configured to support the plurality of locking elements when the plurality of locking elements are in the locking position, wherein two first locking elements of the plurality of locking elements are configured to be supported by a first cam of the plurality of cams, the first cam including first support surfaces for the two first locking elements, the first support surfaces being concentric with respect to the axis of rotation, wherein a gap is formed between the respective concentric first support surface and the respective first locking element disposed in the locking position, and upon exceedance of a force acting on the first and second fitting parts the gap is closed so that the two first locking elements are supported on the respective concentric first support surfaces, and wherein at least one second locking element of the plurality of locking elements is supported by and in contact with at least one second cam of the plurality of cams in the locking position, the at least one second cam including at least one second support surface for the at least one second locking element.

11. The detent fitting of claim 10, wherein the two first locking elements includes a number of support protrusions and the first support surfaces are configured to support the number of support protrusions of the two first locking elements, wherein the first support surfaces are disposed radially offset from each other.

12. The detent fitting of claim 10, wherein the cam element forms a number of receiving areas, wherein each of the plurality of cams are delimited by two receiving areas of the number of receiving areas, and the two receiving areas are adjacent with respect to a circumferential direction about the axis of rotation and are set back radially towards the axis of rotation with respect to adjacent first or second support surfaces.

13. The detent fitting of claim 11, wherein the cam element forms a number of receiving areas, wherein a portion of the first cam disposed between the first support surfaces does not form a receiving area of the number of receiving areas.

14. The detent fitting of claim 10, wherein all cams of the plurality of cams each have a different shape.

15. The detent fitting of claim 10, wherein the second support surfaces are inclined with respect to a circle concentric with the axis of rotation, wherein each of the second support surfaces is configured to bias the respective second locking element of the plurality of locking elements to engage the toothing of the second fitting part so that the second locking element is frictionally secured with the toothing.

16. The detent fitting of claim 10, wherein at least one tooth filling is provided on the toothing of the second fitting part.

17. The detent fitting of claim 10, further comprising:

a free-pivoting device including a free-pivoting portion configured to cooperate with at least one of the locking elements of the plurality of locking elements when the at least one of the locking elements is disengaged with the toothing of the second fitting part in order to prevent the locking element from moving to the locking position, wherein the free-pivoting portion extends over more than 90 degrees around the axis of rotation.

18. The detent fitting of claim 10, wherein each of the locking elements of the plurality of locking elements are spaced apart from one another by different distances.

19. The detent fitting of claim 10, wherein the plurality of locking elements equals four locking elements.

20. A vehicle seat comprising:
a seat part;
a backrest; and
a detent fitting coupling the backrest to the seat part so that the backrest is pivotable relative to the seat part, wherein the detent fitting includes;
a first fitting part and a second fitting part each configured to rotate relative to one another about an axis of rotation,
a plurality of locking elements movably mounted relative to the first fitting part and configured to move to a locking position, in which the plurality of locking elements engage a toothing of the second fitting part, and
a cam element rotatably mounted relative to the first fitting part and including a plurality of cams configured to support the plurality of locking elements when the plurality of locking elements are in the locking position, wherein:
two first locking elements of the plurality of locking elements are configured to be supported by a first cam of the plurality of cams, the first cam including first support surfaces for the two first locking elements, the first support surfaces being concentric with respect to the axis of rotation, wherein a gap is formed between the respective concentric first support surface and the respective first locking element disposed in the locking position, and upon exceedance of a force acting on the first and second fitting parts the gap is closed so that the two first locking elements are supported on the respective concentric first support surfaces, and wherein
at least one second locking element of the plurality of locking elements is supported by and in contact with at least one second cam of the plurality of cams in the locking position, the at least one second cam including at least one second support surface for the at least one second locking element.

* * * * *